Nov. 9, 1943.    S. J. ROBINS    2,334,128
GAUGE
Filed Jan. 20, 1943
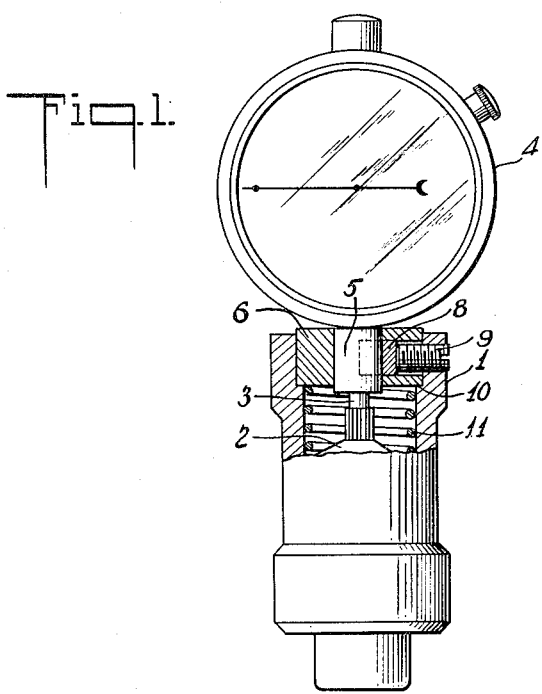
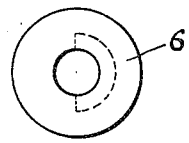
INVENTOR.
Stanley John Robins
BY
*Michaelis & Michaelis*
ATTORNEYS Patented Nov. 9, 1943

2,334,128

UNITED STATES PATENT OFFICE 2,334,128

GAUGE

Stanley John Robins, New York, N. Y., assignor to Triton Precision Corporation, New York, N. Y.

Application January 20, 1943, Serial No. 472,959

2 Claims. (Cl. 33—172)

This invention relates to gauges, more especially of the dial indicator type.

It is an object of this invention to improve this type of gauges in providing means for connecting the indicator body with the spindle housing in a better manner than is the case in similar instruments now in use.

As is well known to those skilled in the art, devices of this kind consist of two main parts, viz. the housing containing the measuring or gauging mechanism which includes a spindle, and a dial to which the movements of that mechanism are transmitted by the spindle. In the instruments of this type as at present in use, the spindle bushing serving to connect the dial indicator to the housing is fixed in the housing by means of a clamp or a screw. Either of these holding means is objectionable in that it is likely to injure the indicator body and to clamp fast the spindle.

According to this invention, now, the ring surrounding the spindle bushing is fixed in place in the housing by a screw which however does not act directly on the ring, but on an insert fitting in a recess formed in the ring. This insert, acting on a large part of the circumference of the spindle bushing, will, when acted on by the set screw, exert uniform pressure on this part of the bushing, which is thus protected together with the spindle against injury.

In the drawing affixed to this specification and forming part thereof an embodiment of the invention is illustrated by way of example.

In the drawing

Fig. 1 is a front elevation of the instrument with the top part of the housing and the insert shown in axial section.

Figs. 2 and 3 are a plan view and an axial section respectively, of the recessed ring, and Figs. 4 and 5 are similar views of the semicircular part inserted in the recess.

Referring to the drawing, 1 is the gauge housing, 2 is part of the measuring mechanism mounted in this housing and 3 is the spindle transmitting the movement of the mechanism to the indicator. 4 is the dial indicator, 5 is the sleeve or bushing surrounding the top end of the spindle and 6 is the ring embracing this bushing and seated on a shoulder 10 formed in the housing wall, 7 in Fig. 3 shows the semicircular recess formed in the ring 6 and 8 is the semicircular insert fitting in this recess and embracing one half of the circumference of the bushing 5. This insert is materially thinner than the ring 6, thus leaving room for the set screw 9 mounted in a bore of the housing wall to project into the recess 7 and act through the insert on the bushing fixed to the dial indicator, which is thus secured in place on the housing without the danger of injury by the screw. Since the outer diameter of the insert is smaller than the outer diameter of the ring, the screw extending into the ring from the beginning prevents the ring from being lifted off its seat by the coil spring 11 acting on the ring.

I wish it to be understood that I do not wish to be limited to the details of construction described above and shown in the drawing, since obvious modifications will occur to a person skilled in the art.

I claim:

1. In a gauge of the dial indicator type the combination of a housing for the gauge mechanism, a dial indicator and a bushing extending from said indicator and into the top part of said housing, with a closed ring seated in the top part of said housing and surrounding said bushing, said ring being formed with a recess extending from the outer cylindrical surface to the inner surface of said ring, an insert of semicircular section in said recess embracing a large part of the surface of said bushing, and a screw extending through the housing wall into said recess and into contact with said insert.

2. The combination of claim 1, in which the insert is a body of semicircular section, the diameter of which is smaller than the outer diameter of the ring.

STANLEY JOHN ROBINS.